United States Patent [19]

Ross et al.

[11] 4,232,572
[45] Nov. 11, 1980

[54] ENGINE-TRANSMISSION CONTROL SYSTEM

[75] Inventors: William A. Ross; Frederic W. Pollman, both of Ames, Iowa

[73] Assignee: Sundstrand Corporation, Rockford, Ill.

[21] Appl. No.: 925,362

[22] Filed: Jul. 17, 1978

[51] Int. Cl.² .................. B60K 41/16; F16D 31/02
[52] U.S. Cl. .................................. 74/859; 74/867; 74/877; 60/431
[58] Field of Search ............... 74/859, 867, 877, 687; 60/431, 433

[56] References Cited

U.S. PATENT DOCUMENTS

| | | |
|---|---|---|
| 3,139,723 | 7/1964 | Hollowell . |
| 3,237,398 | 3/1966 | Croswhite . |
| 3,256,747 | 6/1966 | Kempson . |
| 3,285,000 | 11/1966 | Christenson et al. . |
| 3,298,174 | 1/1967 | Stoyke et al. . |
| 3,583,154 | 6/1971 | Utter . |
| 3,733,931 | 5/1973 | Nyman et al. . |
| 3,855,793 | 12/1974 | Pollman et al. . |
| 3,898,812 | 8/1975 | Walton ............................ 60/431 |
| 3,943,712 | 3/1976 | Stuhr ............................... 60/431 X |
| 3,969,896 | 7/1976 | Louis .............................. 60/431 |
| 4,102,131 | 7/1978 | Reynolds et al. ............... 60/431 |

*Primary Examiner*—James Kee Chi

*Attorney, Agent, or Firm*—Wegner, Stellman, McCord, Wiles & Wood

[57] ABSTRACT

An engine-transmission control system having an engine associated with a variable hydrostatic transmission with a ratio governor valve to set the transmission ratio and, thus, control engine speed, a horsepower demand signal valve and an engine speed signal valve with the signals derived from these valves being applied in opposition to the ratio governor valve for control thereof, and an engine fuel governor for the engine providing an operating curve for the engine which relates engine speed to engine horsepower to cause operation along the locus of minimum fuel consumption for the engine whereby operation of the transmission to set the engine speed determines engine horsepower by operation of the engine along the operating curve. The system includes linkage means associating an accelerator pedal with the horsepower demand signal valve and the fuel control to provide a range of movement for the horsepower demand signal valve greater than that of the fuel governor, a lost motion connection in the linkage means which permits operation of the fuel governor in advance of the horsepower demand signal valve upon initial operation of the accelerator member, and second linkage means associated with an engine brake member for control of the horsepower demand signal valve without movement of the fuel governor and with relations between the linkage means whereby one linkage means may operate independently of the other.

17 Claims, 2 Drawing Figures

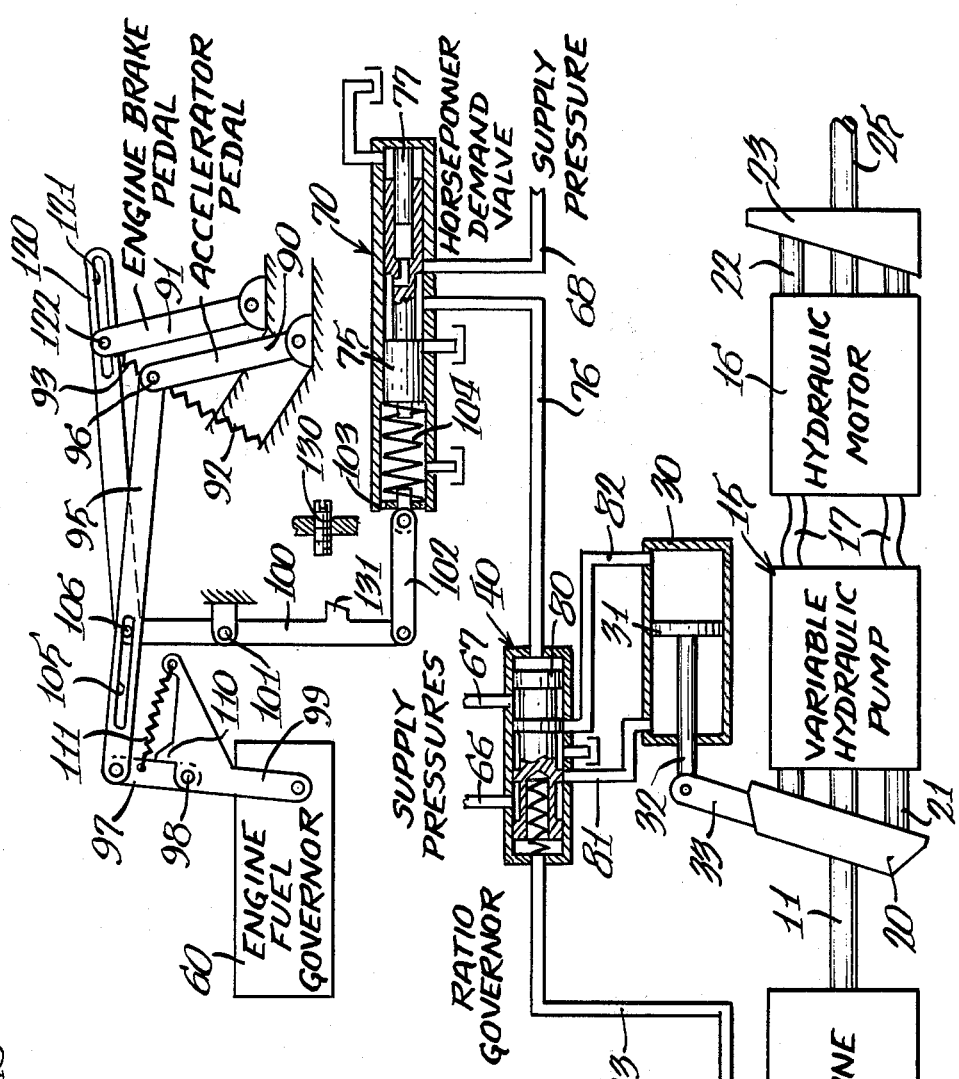

ENGINE-TRANSMISSION CONTROL SYSTEM

BACKGROUND OF THE INVENTION

The invention disclosed herein pertains to an engine-transmission control system wherein the transmission ratio of the transmission can be set to determine engine speed and a fuel governor for the engine operates to effect different engine horsepower levels and a particular horsepower level for a particular engine speed, with the operating line or curve of the engine under control of the governor being along the locus of minimum fuel consumption.

When using an infinitely variable transmission with an internal combustion engine, it is desirable to control engine speed with a relationship to engine power in order to keep the engine operating on the locus of minimum fuel consumption. This desired result is sought in both hydromechanical transmissions, which have a combined mechanical and hydraulic output, as well as hydrostatic transmissions. A hydrostatic transmission is disclosed in this application while an example of a hydromechanical transmission to which the invention is applicable is shown in U.S. Pat. No. 3,733,931, owned by the assignee of this application. In order to accomplish this result, prior systems have measured both engine speed and horsepower and then translated back into an analog signal which is transmitted to the control for the hydrostatic transmission components. This varies the transmission ratio to maintain the engine on the operating line. This translation must be done with some degree of accuracy and this requires precision measurement. Examples of such prior systems are shown in U.S. Pat. No. 3,855,793, owned by the assignee of this application.

SUMMARY OF THE INVENTION

A primary feature of the invention disclosed herein resides in the simplification of an engine-transmission control resulting from utilization of an engine fuel governor which has the lug line of the engine coincident with the locus of minimum fuel consumption whereby control of the engine speed by setting of the transmission ratio automatically cuts back the fuel supplied to the engine as the engine speed signal is reduced. With such a system, it is no longer necessary to measure engine horsepower.

As a matter of normal practice, manufacturers of diesel engines have supplied engines with a fuel control which determines an upper limit for engine horsepower at any engine speed. This relationship is described by a line which is usually called a lug curve. Normally, this lug curve does not approximate minimum fuel consumption at part engine power, but normally is selected to provide for good vehicle performance when standard gear transmissions are used. This lug curve is frequently shifted by engine manufacturers to achieve different vehicle performance characteristics with different types of gear transmissions.

With the lug curve moved to the locus of minimum fuel consumption, an infinitely variable transmission does not have to provide for maintaining the operating line or lug curve of the engine, but only insure that the engine is running on the lug curve. This can be done by merely running the engine at a high throttle setting and changing transmission ratio to change engine speed in order to effect different horsepower levels. As long as the horsepower setting at the fuel control exceeds the horsepower setting determined by engine speed control within the transmission, then the transmission setting will be determinate of engine horsepower, but the engine governor will determine the operating line.

A primary object of the invention is to provide an engine-transmission control system wherein control of engine speed by control of the transmission ratio automatically results in a selected value of engine horsepower, with the speed and horsepower relation of the engine being along an operating line coincident with the locus of minimum fuel consumption for the engine.

Still another object of the invention is to provide an engine-transmission control system, as defined in the preceding paragraph, wherein a linkage means is associated with the fuel governor, a horsepower demand signal valve and an accelerator member whereby the accelerator member operates the valve and the fuel governor with a lost motion connection to have the fuel governor operated in advance of the valve and including a breakover connection whereby the valve may be operated a further distance after the fuel governor is at its full position.

Still another object of the invention is to provide a fuel system as defined in the preceding paragraphs wherein an additional linkage means associates an engine brake pedal with the horsepower demand signal valve but not the fuel governor, said two linkage means being connected to a common lever operatively connected to said valve, and lost motion connections to permit independent operation of the two linkage means.

BRIEF DESCRIPTION OF THE DRAWINGS

FIG. 1 is a diagrammatic view with parts in section showing the control system; and FIG. 2 is a graph plotting brake power against engine speed and showing typical engine performance characteristics.

DESCRIPTION OF THE PREFERRED EMBODIMENT

The engine-transmission control system is shown in FIG. 1 in association with primary components including an engine, indicated generally at 10, and which may be an internal combustion engine, such as a diesel engine, and having a drive shaft 11 connected to a variable hydraulic pump 15 of a hydrostatic transmission which also includes a hydraulic motor 16 and with the pump motor being hydraulically interconnected by lines indicated diagrammatically at 17.

As well known in the art, the pump 15 and motor 16 may be axial piston units with the pump 15 having a variable angle swash plate 20 for controlling the strokes of pistons 21 of the pump and with the motor having pistons 22 under the control of a fixed swash plate 23 and with the motor being connected to an output shaft 25. The angle of the swash plate 20 is under the control of a servo cylinder 30 having a piston 31 connected to the swash plate 20 through a rod 32 and extension arm 33 of the swash plate. The position of the piston 31 is controlled by a ratio governor valve, indicated generally at 40.

The engine 10 has performance characteristics, as shown in the graph of FIG. 2. This graph plots engine speed against brake power and has a number of lines 45–49 showing brake specific fuel consumption in certain amounts per unit of time for a typical engine. A normal lug curve for a diesel engine is shown by the line having line sections 50 and 51 which shows that the fuel consumption and engine horsepower varies at different engine speeds. In the control system disclosed herein, an engine fuel governor 60 for the engine 10 provides for control of the engine to shift the normal lug curve, indicated by line sections 50 and 51, to an operating line or curve 61 which lies along the locus of minimum fuel consumption for the engine at varying engine speeds. The operating line 61 has an initial line section 61a which represents a start-up condition. With the operation of the engine along the operating line 61 under the control of the fuel governor 60, then it is no longer necessary to have control signals for establishing both the transmission ratio within the hydrostatic transmission and also establish a fuel setting for the engine.

The engine fuel governor 60 controls a fuel throttle for the engine 10 in response to an engine speed analog signal and a fuel demand analog signal. A summer device compares these signals for controlling the fuel throttle.

For operation of the control system, there are a number of supply pressure lines 65, 66, 67 and 68 associated with an engine speed signal valve 69 which functions as an input speed sensor, ratio governor valve 40 and a horsepower demand signal valve 70, respectively. The use of an engine speed signal valve is well known in the art and, for example, has a flyweight structure 71 rotatable by the output shaft 11 of the engine for controlling a valve member 72 to provide a hydraulic analog signal through a line 73 to the ratio governor valve 40. The horsepower demand signal valve 70 is also well known in the art and can be of the type shown in FIG. 3 of the above-referred to U.S. Pat. No. 3,855,793. This valve has a valve member 75 with control lands which control the valve of a hydraulic signal applied through a line 76 to the ratio governor valve 40 in opposition to the analog cylinder delivered from the engine speed signal valve 69 through line 73. The hydraulic signal in the horsepower demand signal valve 70 is fed back through an internal passage in the valve member 75 to act on the valve member within a chamber receiving a fixed piston 77.

The ratio governor valve has a valve member 80 which controls the delivery of supply pressure to the servo cylinder 30 through either of lines 81 or 82 from the supply lines 66 and 67. This control is by positioning of the valve member 80 in response to the values of the analog signals derived from the horsepower demand signal valve and the engine speed signal valve which act in opposition.

Operator control of the system is derived from a pair of actuable members including an accelerator member 90, in the form of accelerator pedal, and an engine brake member 91, in the form of a pedal, which are each pivotally mounted to a support at a desired location. Each pedal is urged to an inoperative position in a clockwise direction by a pair of compression springs 92 and 93 associated one with each of the pedals.

The accelerator pedal 90 has linkage means associated therewith for causing operation of both the engine fuel governor 60 and the horsepower demand signal valve 70. This linkage means includes an operating link 95 pivotally connected to the accelerator pedal at 96 and extending to a pivotal connection with a link 97 which is pivotally connected at 98 to a lever 99 operable to control the engine fuel governor. The operating link 95 has a lost motion connection to a common lever 100 which is pivotally connected intermediate its ends at 101 to a fixed support and operatively connected to the horsepower demand signal valve through a pivoted link 102. The link 102 is pivotally connected to a movable operating member 103 for controlling the position of the valve member 75 through a spring 104. The lost motion connection includes an elongate slot 105 in the operating link and a pin 106 movably mounted therein and carried at the upper end of the common lever 100.

The aforesaid lost motion connection enables initial depression of the accelerator pedal 90 to operate the fuel governor in advance of operation of the horsepower demand signal valve whereby fuel is supplied to the engine in advance of any demand upon the system.

The full open position of the fuel governor 60 is reached before full travel of the common lever 100. In order to permit continued movement of the common lever 100, there is a breakover connection provided by an abutment 110 on the lever 99 against which the lever 97 abuts and with a spring 111 providing yieldable means urging these parts into abutting relation. When the fuel governor lever 99 is at its full open position, which is a position counterclockwise of that shown in FIG. 1, there will be no further movement of the lever but continued movement of the operating link 95 toward the left will result in movement of the lever 97 away from the abutment 110, as permitted by the spring 111 to provide for further pivoting movement of the common lever 100. Upon return of the accelerator pedal 90 to inactive position, the abutting relation will be restored and the fuel governor lever 99 moved in a clockwise direction. The initial movement of the accelerator pedal 90 first causes movement of the fuel governor lever 99 followed by movement of the common lever 100 to provide the range of operation indicated by the section 61a of the operating line.

Once the fuel governor is set at its full open position, there is operation of the engine along the line 61 of the operating line under control of the setting of the transmission ratio which results in setting the engine speed. This setting of the transmission ratio is accomplished by the ratio governor 40, which is a nulling device, and which ports fluid to the servo cylinder 30 and acts to resultingly change engine speed until actual engine horsepower matches demand horsepower. This results from the opposed signals derived from the engine speed signal valve 69 and the horsepower demand signal valve 70. The demand horsepower is established by the position of the common lever 100 under the control of the accelerator pedal 90 which operates to control the compression of the spring 104 for causing movement of the valve member 75 to establish a horsepower demand signal in line 76. This signal is applied as a feedback to the valve 75 to cause the valve to reach a null position. The engine speed signal valve 69 provides an increasing pressure signal with increasing engine speed, while the horsepower demand signal valve 70 provides an increasing pressure signal with further depression of the accelerator pedal 90.

A second linkage means is associated with the engine brake pedal 91 and includes an operating link 120 which connects to the pin 106 at the upper end of the common lever 100, with the latter lever being common to both of the linkage means. The operating link 120 has a lost motion connection provided by an elongate slot 121 which receives a pin 122 carried at the upper end of the engine brake pedal 91. With this lost motion connection as well as that provided by the previously described lost motion connection including slot 105 and pin 106, it is possible to have independent operation of the pedals 90 and 91 with respect to the horsepower demand signal valve 70 and to avoid the engine brake pedal 91 having any controlling effect on the engine fuel governor 60.

With depression of the engine brake pedal 91 until the pin 122 reaches the end of slot 121 and with further movement, the common lever 100 will be pivoted in a counterclockwise direction to cause action of the horsepower demand signal valve to obtain engine braking without any movement of the engine fuel governor lever 99. The lost motion connection including slot 105 permits the movement of common lever 100 by brake pedal 91 without operating the fuel governor. Similarly, movement of the common lever 100 by the accelerator pedal 90 is not prevented by the engine brake pedal since the operating link 120 of the brake pedal linkage, which is caused to move with the common lever 100, merely moves freely because of the relation of the slot 121 to the pin 122 on the brake pedal.

An adjustable stop 130 is positioned to coact with an abutment 131 on the common lever 100 and to limit the travel of the common lever and, thus, limit movement of the horsepower demand signal valve. The adjustability provides for fine adjustments of maximum engine speed.

The control system disclosed herein has the fuel governor 60 controlling an operating line for the engine whereby a particular engine speed establishes a particular engine horsepower. With this operation, the transmission ratio can be set to establish a particular engine speed which will result in a determination of engine horsepower. Engine speed as representative of engine horsepower can be compared against demand horsepower at the ratio governor valve 40 to obtain a match therebetween. As long as the horsepower setting at the fuel control, as provided by the engine fuel governor 60, exceeds the horsepower setting determined by engine speed as controlled within the transmission, then the transmission setting will be the determinant of engine horsepower and the engine governor will determine the operating line for the engine.

We claim:

1. An engine-transmission control system for an engine utilizing no fuel control other than a fuel governor comprising, a variable hydrostatic transmission, a variable speed engine connected to said transmission, a fuel governor for said engine which provides an engine operating curve conforming to the locus of minimum fuel consumption of the engine and which establishes a particular engine horsepower at any particular engine speed, a horsepower demand signal valve, an engine speed signal valve, and means including a ratio governor valve responsive to horsepower demand and engine speed signals to set the transmission ratio of the hydrostatic transmission and control engine power delivery by action of the fuel governor resulting from the transmission ratio establishing an engine speed.

2. A control system as defined in claim 1 including an accelerator member and linkage means interconnecting said member with the fuel governor and with the horsepower demand signal valve.

3. A control system as defined in claim 2 wherein said linkage means includes a lost motion connection to the horsepower demand signal valve whereby the latter is operated after the fuel governor upon actuation of the accelerator member.

4. A control system as defined in claim 2 wherein said linkage means includes a breakover connection to the fuel governor whereby movement of the accelerator member beyond a certain position causes further movement of the horsepower demand signal valve without further movement of the fuel governor.

5. A control system as defined in claim 4 wherein said linkage includes a lever for operating the fuel governor and said breakover connection comprises a link pivoted to said lever, an abutment on said lever engageable by said link, and means yieldably interconnecting said link and lever to cause engagement between the link and abutment during movement of the accelerator member to said certain position.

6. A control system as defined in claim 2 wherein said linkage means includes a lost motion connection to the horsepower demand signal valve whereby the latter is operated after the fuel governor upon actuation of the accelerator member and further includes a breakover connection to the fuel governor whereby movement of the accelerator member beyond a certain position causes further movement of the horsepower demand signal valve without further movement of the fuel governor.

7. A control system as defined in claim 2 further including an engine brake member and second linkage means interconnecting said engine brake member to the horsepower demand signal valve but not to the fuel governor.

8. A control system as defined in claim 7 wherein the linkage means connected to the accelerator member and said second linkage means include a common lever operatively connected to the horsepower demand signal valve, and with each of said linkage means including a lost motion connection whereby said common lever may be operated by either linkage means independent of the other.

9. A control system as defined in claim 8 wherein the linkage means connected to the accelerator member includes an operating link extended to the fuel governor and the lost motion connection comprises a coacting slot in the operating link and a pin on the common lever whereby initial movement of the fuel governor occurs prior to initial movement of said common lever upon initial movement of the accelerator member.

10. An engine-transmission control system comprising, a variable hydrostatic transmission, a variable speed engine connected to said transmission, a fuel governor for said engine operable to establish a certain engine horsepower at any engine speed which is established while providing an engine operating curve conforming to the locus of minimum fuel consumption for the engine, a horsepower demand signal valve, an engine speed signal valve, means including a ratio governor valve responsive to horsepower demand and engine speed signals to set the transmission ratio of the hydrostatic transmission and establish engine speed, an accelerator member, and linkage means interconnecting said accelerator member with said fuel governor and with said horsepower demand signal valve and operable to set the fuel governor at a full open position in advance of substantial movement of the horsepower demand signal valve.

11. A control system as defined in claim 10 wherein said linkage means includes a lost motion connection to the horsepower demand signal valve whereby the latter is operated after the fuel governor upon actuation of the accelerator member.

12. A control system as defined in claim 10 wherein said linkage means includes a breakover connection to the fuel governor whereby movement of the accelerator member beyond a certain position causes further movement of the horsepower demand signal valve without further movement of the fuel govenor.

13. A control system as defined in claim 12 wherein said linkage includes a lever for operating the fuel governor and said breakover connection comprises a link pivoted to said lever, an abutment on said lever engageable by said link, and means yieldably interconnecting said link and lever to cause engagement between the link and abutment during movement of the accelerator member to said certain position.

14. A control system as defined in claim 10 wherein said linkage means includes a lost motion connection to the horsepower demand signal valve whereby the latter is operated after the fuel governor upon actuation of the accelerator member and further includes a breakover connection to the fuel governor whereby movement of the accelerator member beyond a certain position causes further movement of the horsepower demand signal valve without further movement of the fuel governor.

15. A control system as defined in claim 10 further including an engine brake member and second linkage means interconnecting said engine brake member to the horsepower demand signal valve but not to the fuel governor.

16. A control system as defined in claim 15 wherein the linkage means connected to the accelerator member and said second linkage means include a common lever operatively connected to the horsepower demand signal valve, and with each of said linkage means including a lost motion connection whereby said common lever may be operated by either linkage means independent of the other.

17. A control system as defined in claim 16 wherein the linkage means connected to the accelerator member includes an operating link extended to the fuel governor and the lost motion connection comprises a coacting slot in the operating link and a pin on the common lever whereby initial movement of the fuel governor occurs prior to initial movement of said common lever upon initial movement of the accelerator member.

* * * * *